US007697186B2

(12) United States Patent
McCallion et al.

(10) Patent No.: US 7,697,186 B2
(45) Date of Patent: Apr. 13, 2010

(54) SPECTRAL RESPONSE MODIFICATION VIA SPATIAL FILTERING WITH OPTICAL FIBER

(75) Inventors: Kevin McCallion, Charlestown, MA (US); Daniel Mahgerefteh, Somerville, MA (US); Michael Deutsch, Derry, NH (US); Parviz Tayebati, Boston, MA (US)

(73) Assignee: Finisar Corporation, Sunnyvale, CA (US)

( * ) Notice: Subject to any disclaimer, the term of this patent is extended or adjusted under 35 U.S.C. 154(b) by 106 days.

(21) Appl. No.: 11/977,206

(22) Filed: Oct. 24, 2007

(65) Prior Publication Data

US 2008/0158639 A1    Jul. 3, 2008

Related U.S. Application Data

(60) Provisional application No. 60/853,867, filed on Oct. 24, 2006.

(51) Int. Cl.
*G02F 1/01* (2006.01)
*G02F 1/23* (2006.01)
*H01S 3/00* (2006.01)

(52) U.S. Cl. .................... 359/238; 359/278; 359/341.3; 398/145; 398/185; 398/201; 385/15; 385/147

(58) Field of Classification Search ................. 359/238, 359/278, 315, 341.3, 342, 345; 398/182, 398/185–187, 115, 145, 201; 385/15, 24, 385/27, 31, 37, 147; 372/6, 20, 18, 23, 31, 372/36, 72; 356/124, 124.5; 250/227.12
See application file for complete search history.

(56) References Cited

U.S. PATENT DOCUMENTS 3,324,295  A    6/1967  Harris (Continued)

FOREIGN PATENT DOCUMENTS

GB    2 107 147    4/1983

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner*—Loha Ben
(74) *Attorney, Agent, or Firm*—Workman Nydegger (57) ABSTRACT

An optical system comprising a frequency modulated laser source adapted to produce a frequency modulated optical beam, an optical spectrum reshaper (OSR) adapted to receive the frequency modulated optical beam from the laser source and convert it into an amplitude modulated optical beam, a focusing lens adapted to receive the amplitude modulated optical beam from the OSR and focus the same, and an optical fiber adapted to receive the amplitude modulated optical beam from the focusing lens and transmit an optical signal; characterized in that the OSR has a central axis, the focusing lens has a central axis, and the optical fiber has a central axis, with the central axis of the optical fiber being laterally offset from at least one of the central axis of the OSR and the central axis of the focusing lens so as to effect spatial filtering and thereby generate the desired optical transmission characteristics for the resulting optical signal in the optical fiber.

14 Claims, 10 Drawing Sheets

U.S. PATENT DOCUMENTS

| | | | |
|---|---|---|---|
| 3,999,105 A | 12/1976 | Archey et al. | |
| 4,038,600 A | 7/1977 | Thomas | |
| 4,561,119 A | 12/1985 | Epworth | |
| 4,671,604 A * | 6/1987 | Soref | 398/145 |
| 4,805,235 A | 2/1989 | Henmi | |
| 4,841,519 A | 6/1989 | Nishio | |
| 5,136,598 A * | 8/1992 | Weller et al. | 372/26 |
| 5,293,545 A | 3/1994 | Huber | |
| 5,325,378 A | 6/1994 | Zorabedian | |
| 5,371,625 A | 12/1994 | Wedding et al. | |
| 5,412,474 A | 5/1995 | Reasenberg et al. | |
| 5,416,629 A | 5/1995 | Huber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,592,327 A | 1/1997 | Gabl et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle | |
| 5,920,416 A | 7/1999 | Beylat et al. | |
| 5,953,139 A | 9/1999 | Nemecek et al. | |
| 5,974,209 A | 10/1999 | Cho et al. | |
| 6,081,361 A | 6/2000 | Adams et al. | |
| 6,096,496 A | 8/2000 | Frankel | |
| 6,104,851 A | 8/2000 | Mahgerefteh | |
| 6,115,403 A | 9/2000 | Brenner et al. | |
| 6,222,861 B1 | 4/2001 | Kuo et al. | |
| 6,271,959 B1 | 8/2001 | Kim et al. | |
| 6,298,186 B1 | 10/2001 | He | |
| 6,331,991 B1 | 12/2001 | Mahgerefteh | |
| 6,359,716 B1 | 3/2002 | Taylor | |
| 6,473,214 B1 | 10/2002 | Roberts et al. | |
| 6,506,342 B1 | 1/2003 | Frankel | |
| 6,563,623 B1 | 5/2003 | Penninckx et al. | |
| 6,577,013 B1 | 6/2003 | Glenn et al. | |
| 6,618,513 B2 | 9/2003 | Evankow, Jr. | |
| 6,654,564 B1 | 11/2003 | Colbourne et al. | |
| 6,665,351 B2 | 12/2003 | Hedberg et al. | |
| 6,687,278 B1 | 2/2004 | Mason et al. | |
| 6,690,686 B2 * | 2/2004 | Delfyett et al. | 372/18 |
| 6,748,133 B2 | 6/2004 | Liu et al. | |
| 6,778,307 B2 | 8/2004 | Clark | |
| 6,810,047 B2 | 10/2004 | Oh et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,054,538 B2 | 5/2006 | Mahgerefteh et al. | |
| 7,076,170 B2 | 7/2006 | Choa | |
| 7,123,846 B2 | 10/2006 | Tateyama et al. | |
| 7,263,291 B2 | 8/2007 | Mahgerefteh et al. | |
| 7,280,721 B2 | 10/2007 | McCallion et al. | |
| 7,406,266 B2 * | 7/2008 | Mahgerefteh et al. | 398/186 |
| 7,474,859 B2 * | 1/2009 | Mahgerefteh et al. | 398/201 |
| 7,477,851 B2 * | 1/2009 | Mahgerefteh et al. | 398/201 |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002120 A1 | 1/2003 | Choa | |
| 2003/0067952 A1 | 4/2003 | Tsukiji et al. | |
| 2003/0099018 A1 | 5/2003 | Singh et al. | |
| 2003/0147114 A1 | 8/2003 | Kang et al. | |
| 2003/0193974 A1 | 10/2003 | Frankel et al. | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0096221 A1 | 5/2004 | Mahgerefteh et al. | |
| 2004/0218890 A1 | 11/2004 | Mahgerefteh et al. | |
| 2005/0100345 A1 | 5/2005 | Welch et al. | |
| 2005/0111852 A1 | 5/2005 | Mahgerefteh et al. | |
| 2005/0175356 A1 | 8/2005 | McCallion et al. | |
| 2005/0206989 A1 | 9/2005 | Marsh | |
| 2005/0271394 A1 | 12/2005 | Whiteaway et al. | |
| 2005/0286829 A1 | 12/2005 | Mahgerefteh et al. | |
| 2006/0002718 A1 | 1/2006 | Matsui et al. | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0228120 A9 | 10/2006 | McCallion et al. | |
| 2006/0233556 A1 | 10/2006 | Mahgerefteh et al. | |
| 2006/0274993 A1 | 12/2006 | Mahgerefteh et al. | |

FOREIGN PATENT DOCUMENTS

| | | |
|---|---|---|
| WO | 9905804 | 2/1999 |
| WO | 0104999 | 1/2001 |
| WO | 03005512 | 7/2002 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutali et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaAl As Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

* cited by examiner

Progression of data through components of the transmitter chain
Schematic of the Chirp Managed Laser Transmitter

Schematic of spatial profile of multiple beamlets in plane of focusing lens

FIG. 5

Spatial offset can make filter sharper or shallower depending on direction

FIG. 6

Effect of spatial offset on peak slope of filter

Typical Filter (OSR) Spectral Passband and key Finisar measurement points

Example of Blocking Apertures for modification of filter spectral response

US 7,697,186 B2

SPECTRAL RESPONSE MODIFICATION VIA SPATIAL FILTERING WITH OPTICAL FIBER

REFERENCE TO PENDING PRIOR PATENT APPLICATION

This patent application claims benefit of prior U.S. Provisional Patent Application Ser. No. 60/853,867, filed Oct. 24, 2006 by Kevin McCallion et al. for SPECTRAL RESPONSE MODIFICATION VIA SPATIAL FILTERING WITH OPTICAL FIBER.

The above-identified patent application is hereby incorporated herein by reference.

FIELD OF THE INVENTION

This invention relates to optical telecommunications in general, and more particularly to optical telecommunications using chirp-managed laser transmitters.

BACKGROUND OF THE INVENTION

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, called the sensitivity, is determined. The difference in sensitivity at the output of the transmitter with the sensitivity after propagation is called the dispersion penalty. This is typically characterized by the distance over which a dispersion penalty reaches a level of ~1 dB. A standard 10 Gb/s optical digital transmitter, such as an externally modulated light source (e.g., a laser), can typically transmit up to a distance of ~50 km in standard single mode fiber, at 1550 nm, before the dispersion penalty reaches the level of ~1 dB, called the dispersion limit. The dispersion limit is determined by the fundamental assumption that the digital signal is transform-limited, i.e., the signal has no time-varying phase across its bits and has a bit period of 100 ps, or 1/(bit rate), for a 10 Gb/s system. Another measure of the quality of a transmitter is the absolute sensitivity after fiber propagation.

Three types of optical transmitters are presently in use in prior art fiber optic systems: (i) directly modulated laser (DML) transmitters, (ii) electroabsorption modulated laser (EML) transmitters, and (iii) externally modulated Mach Zhender (MZ) transmitters. For transmission in standard single mode fiber at 10 Gb/s, and 1550 nm, it has generally been believed that MZ transmitters and EML transmitters can have the longest reach, typically reaching 80 km. Using a special coding scheme, referred to as phase shaped duobinary coding, MZ transmitters can reach 200 km. On the other hand, directly modulated laser (DML) transmitters typically reach <5 km, because their inherent time-dependent chirp (i.e., frequency shifts) causes severe distortion of the signal after this distance.

Various systems have been developed which increase the reach of DML transmitters so as to make them practical for long-reach lightwave data transmission (e.g., >80 km at 10 Gb/s). By way of example but not limitation, long-reach DML transmitters capable of transmitting >80 km at 10 Gb/s in single mode fiber are disclosed in (i) U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM, now U.S. Pat. No. 6,963,685; (ii) U.S. patent application Ser. No. 10/680,607, filed Oct. 6, 2003 by Daniel Mahgerefteh et al. for FLAT DISPERSION FREQUENCY DISCRIMINATOR (FDFD), now U.S. Pat. No. 7,054,538; and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which three patent applications are hereby incorporated herein by reference. The transmitters associated with these novel long-reach DML systems are sometimes referred to as a chirp-managed laser (CML™) transmitter by Azna LLC/Finisar Corporation of Wilmington, Mass.

In these Azna/Finisar chirp-managed laser transmitters, a frequency modulated (FM) source is followed by an optical spectrum reshaper (OSR) which uses the frequency modulation to increase the amplitude modulated signal and partially compensate for dispersion in the transmission fiber. In one embodiment, the frequency modulated source may comprise a directly modulated laser (DML). The optical spectrum reshaper (OSR), sometimes referred to as a frequency discriminator, can be formed by an appropriate optical element that has a wavelength-dependent transmission function (e.g., a filter). The OSR can be adapted to convert frequency modulation to amplitude modulation.

In the novel system of the present invention, which is based on the aforementioned chirp-managed laser (CML™) transmitters of Azna LLC/Finisar Corporation, the chirp properties of the frequency modulated source (e.g., laser) are separately configured, and then further reshaped, by configuring the OSR (e.g., filter) to further extend the reach of the chirp-managed laser transmitter to over 250 km on standard single mode fiber at 10 Gb/s and 1550 nm. The novel system of the present invention preferably also combines, among other things, selected features of chirp-managed laser transmitter systems described in (i) U.S. patent application Ser. No. 11/068,032, filed Feb. 28, 2005 by Daniel Mahgerefteh et al. for entitled OPTICAL SYSTEM COMPRISING AN FM SOURCE AND A SPECTRAL RESHAPING ELEMENT, now U.S. Pat. No. 7,555,225 and (ii) U.S. patent application Ser. No. 11/084,630, filed Mar. 18, 2005 by Daniel Mahgerefteh et al. for FLAT-TOPPED CHIRP INDUCED BY OPTICAL FILTER EDGE, now U.S. Pat. No. 7,406,266, which two patents are hereby incorporated herein by reference.

SUMMARY OF THE INVENTION

These and other objects of the present invention are addressed by providing an optical system comprising a frequency modulated laser source adapted to produce a frequency modulated optical beam, an optical spectrum reshaper (OSR) adapted to receive the frequency modulated optical beam from the laser source and convert it into an amplitude modulated optical beam, a focusing lens adapted to receive the amplitude modulated optical beam from the OSR and focus the same, and an optical fiber adapted to receive the amplitude modulated optical beam from the focusing lens and transmit an optical signal;

characterized in that the OSR has a central axis, the focusing lens has a central axis, and the optical fiber has a central axis, with the central axis of the optical fiber being laterally offset from at least one of the central axis of the OSR and the central axis of the focusing lens so as to effect spatial filtering and thereby generate the desired optical transmission characteristics for the resulting optical signal in the optical fiber.

In another form of the invention, there is provided an optical system comprising a frequency modulated laser source adapted to produce a frequency modulated optical beam, an optical spectrum reshaper (OSR) adapted to receive the frequency modulated optical beam from the laser source and convert it into an amplitude modulated optical beam, a focusing lens adapted to receive the amplitude modulated optical beam from the OSR and focus the same, and an optical fiber adapted to receive the amplitude modulated optical beam from the focusing lens and transmit an optical signal;

characterized in that the amplitude modulated optical beam is coupled into the optical fiber such that it is spatially filtered when it enters the optical fiber in order to produce the desired optical transmission spectrum for the resulting optical signal in the fiber.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts, and further wherein.

DETAILED DESCRIPTION OF THE PRESENT INVENTION

The present invention describes a method for optimizing the spectral response of the optical spectrum reshaping (OSR) element for chirp-managed laser transmitters.

Figure 1:
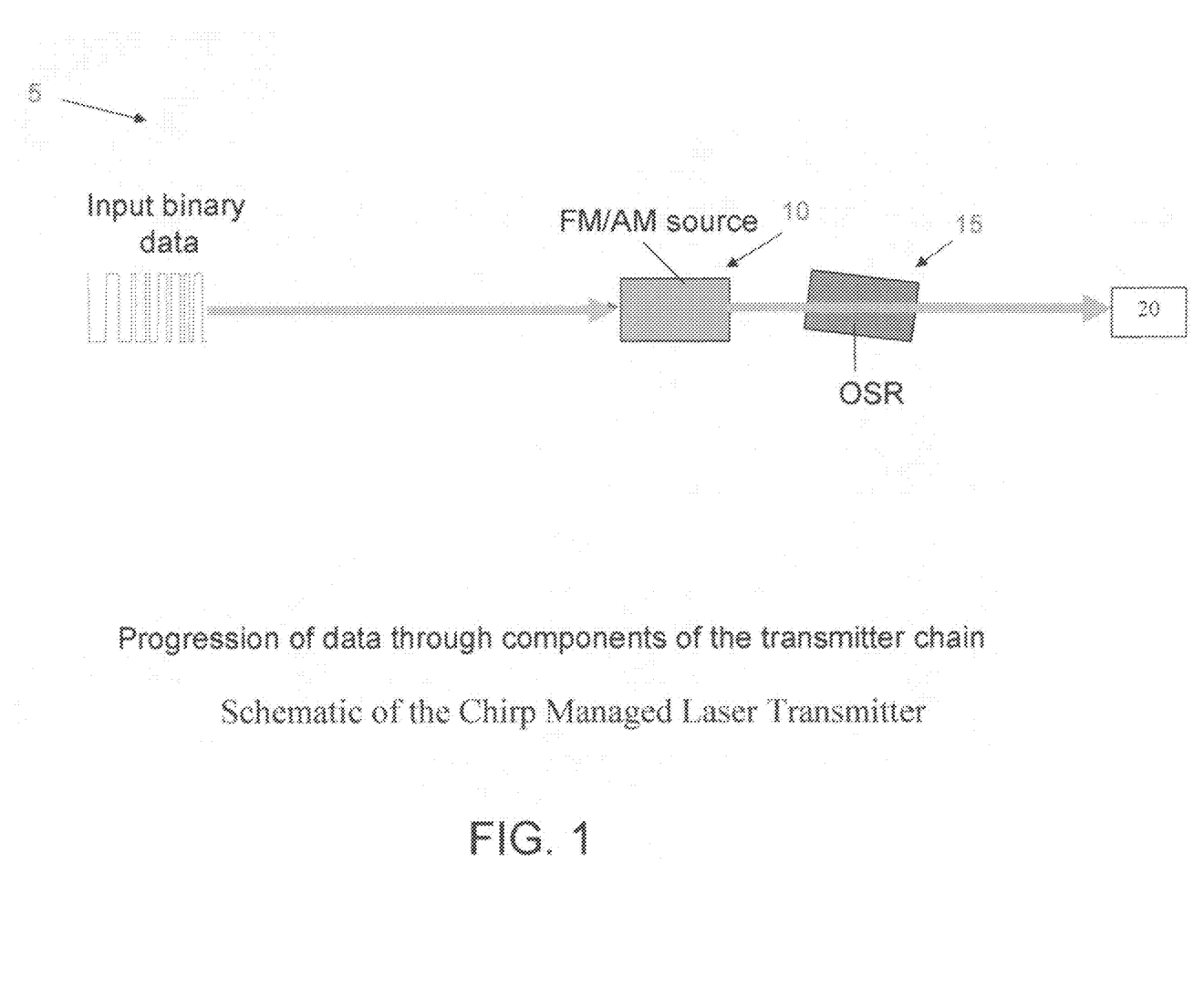
FIG. 1 is a schematic diagram showing a chirp-managed laser transmitter.

As described above, and looking now at FIG. 1, a chirp-managed laser transmitter 5 generally comprises a frequency modulated source 10, such as a distributed feedback (DFB) laser, and an optical spectral reshaping (OSR) element 15 (e.g., a filter). The spectral filter 15, which is sometimes called an optical spectrum reshaper (OSR) by Azna/Finisar, is placed between the DFB laser source and the optical fiber pigtail 20 of the transmitter. Fiber pigtail 20 is the fiber assembly, typically at the end of the transmitter, which couples light from the optical module, i.e., the chirp-managed laser transmitter, into the optical fiber. In the chirp-managed laser transmitter, the spectral response of the OSR filter is designed to convert the frequency modulated light entering the OSR into an amplitude modulated light signal exiting the OSR, reshaping the frequency profile of the resulting signal, as described in the above-identified patent applications, which have been incorporated herein by reference.

The desired spectral shape of the OSR filter may be obtained by using multi-cavity etalon filters, and by adjusting the material, lengths of the cavities, as well as the reflectivity values of the individual etalons.

In addition, an optimized spectral response can be achieved by fine-tuning the filter angular alignment relative to the incoming optical beam incident from the laser, or by adjusting the temperature of the optical filter.

However, the designed filter (OSR) is sometimes difficult to fabricate, or is physically too large, to fit in the small packages of particular applications. It is, therefore, an objective of the present invention to modify the spectral response of an optical filter, post-fabrication, by spatial filtering. Here, spatial filtering is intended to mean adjusting or manipulating the spatial characteristics of the light as it is passed from the optical filter into the optical fiber. Adjusting the physical disposition of the optical fiber relative to the optical filter, and/or placing an aperture to partially block the light passing into the fiber, are examples of such spatial filtering which may be utilized in accordance with the present invention.

Thus, in preferred form of the present invention, there is provided an optical system comprising a frequency modulated laser source adapted to produce a frequency modulated optical beam, an optical spectrum reshaper (OSR) adapted to receive the frequency modulated optical beam from the laser source and convert it into an amplitude modulated optical beam, a focusing lens adapted to receive the amplitude modulated optical beam from the OSR and focus the same, and an optical fiber adapted to receive the amplitude modulated optical beam from the focusing lens and transmit an optical signal;

characterized in that the OSR has a central axis, the focusing lens has a central axis, and the optical fiber has a central axis, with the central axis of the optical fiber being laterally offset from at least one of the central axis of the OSR and the central axis of the focusing lens so as to effect spatial filtering and thereby generate the desired optical transmission characteristics for the resulting optical signal in the optical fiber.

In another preferred form of the invention, there is provided an optical system comprising a frequency modulated laser source adapted to produce a frequency modulated optical beam, an optical spectrum reshaper (OSR) adapted to receive the frequency modulated optical beam from the laser source and convert it into an amplitude modulated optical beam, a focusing lens adapted to receive the amplitude modulated optical beam from the OSR and focus the same, and an optical fiber adapted to receive the frequency modulated optical beam from the focusing lens and transmit an optical signal;

characterized in that the amplitude modulated optical beam is coupled into the optical fiber such that it is spatially filtered when it enters the optical fiber in order to produce the desired optical transmission spectrum for the resulting optical signal in the fiber.

Figure 2:
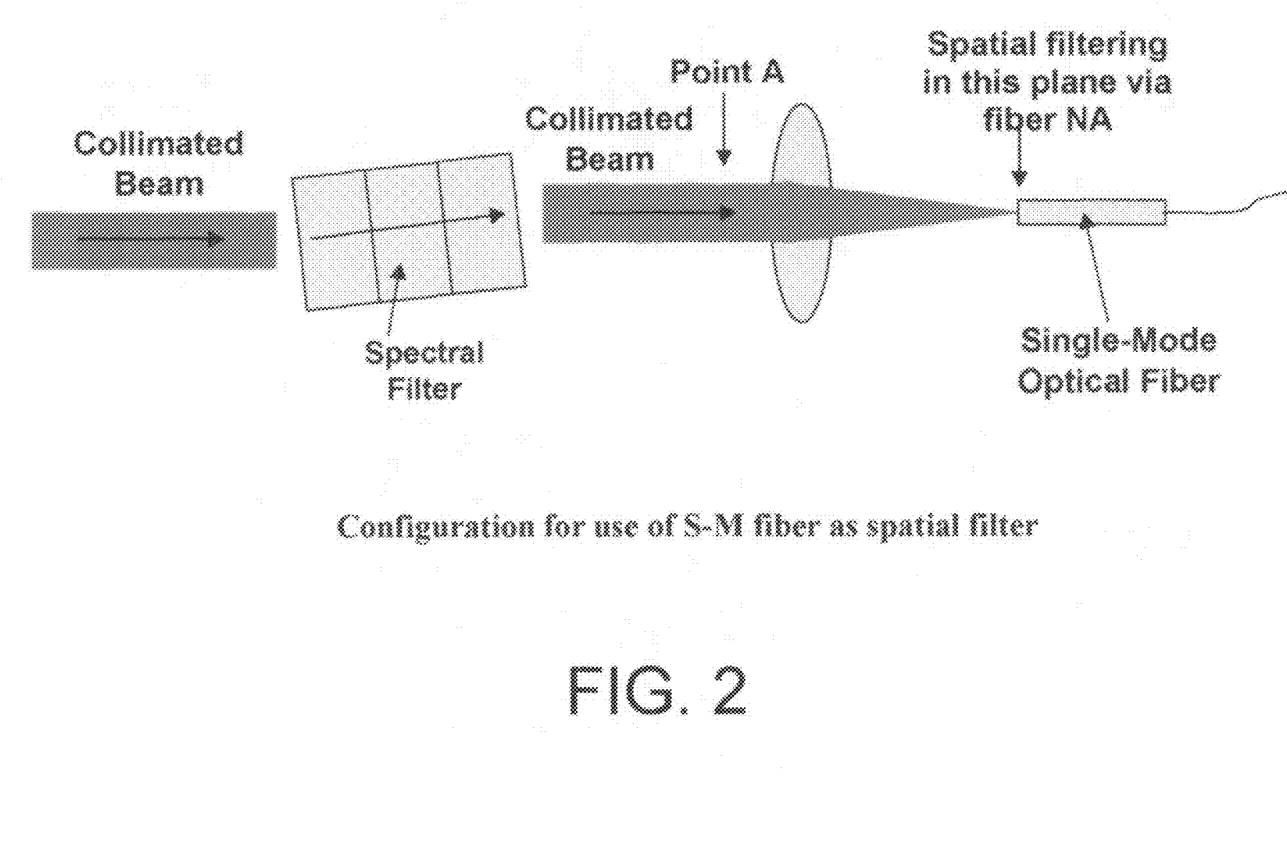
FIG. 2 is a schematic view showing the use of a single-mode (S-M) fiber as a spatial filter.

The measured spectral response of the filter is affected not only by the inherent filter spectral response, but also by any spatial filtering effects resulting from imperfect (not 100%) fiber power coupling into the single mode fiber. In one embodiment of the spatial filtering of the present invention, the filter-lens-fiber coupling arrangement preferentially attenuates some of the spectral components in the optical signal. In other words, the limited numerical aperture of the single-mode optical fiber cuts out spectral content in the incident optical beam. As is well known in the art, the numerical aperture is the approximate angle defined such that all light beams incident at angles below the numerical aperture are coupled into the fiber with minimal attenuation. This effect is illustrated in FIGS. 2 and 3.

Figure 3:
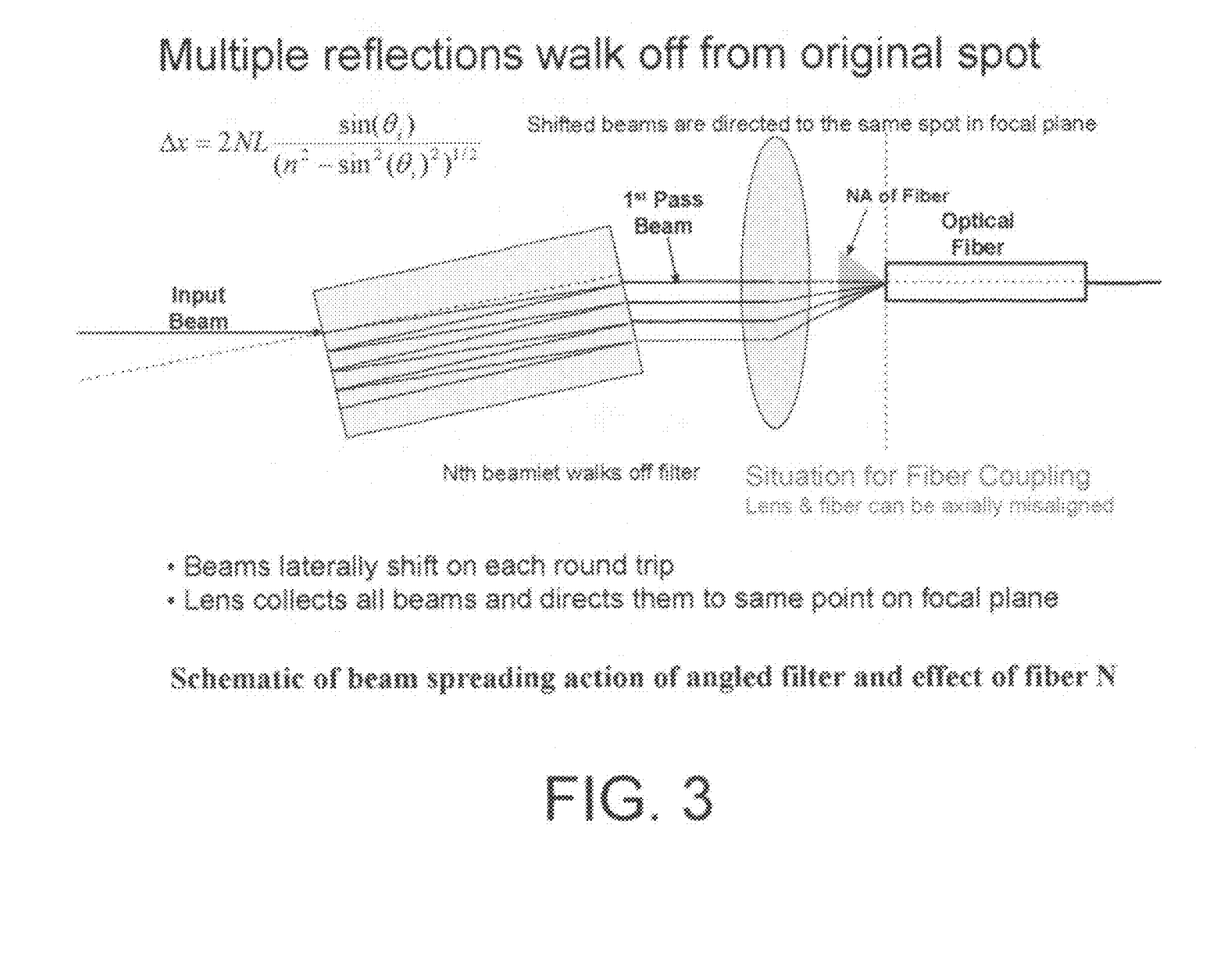
FIG. 3 is a schematic view showing the beam spreading action of an angled filter and the effect of fiber N.

In the particular configuration shown in FIG. 3, the optical filter is intentionally set at a slight angle to the input collimated beam incident from the laser. As FIG. 2 shows, each reflection is laterally shifted relative to the previous one, by a small distance, Δx, where Δx is given by:

$$\Delta x = 2NL \frac{\sin(\theta_i)}{(n^2 - \sin^2(\theta_i)^2)^{1/2}}. \quad (1)$$

Here n is the refractive index of the etalon filter, L is the length of the etalon, $\theta_1$ is the incident angle, and N is the number of round trips. When Δx exceeds the size of the filter perpendicular to the beam, i.e., the filter aperture, the beams reflect out of the filter and the multiple reflections are truncated. Note that if the filter was infinitely wide, or if the angle of incidence were zero, there would result an infinite series of reflections bouncing back and forth between the two facets of the filter, each reflection ever dimmer than the next, much like the infinite images one observes in a hall of mirrors. The truncation of the multiple reflections, described above, are sometimes called beam walk off, and results in a slight spatial spread of the light beam after the filter. Beam walk off makes the spectral response of the filter, when measured after the optical fiber, become a function of the fiber coupling.

Figure 4:
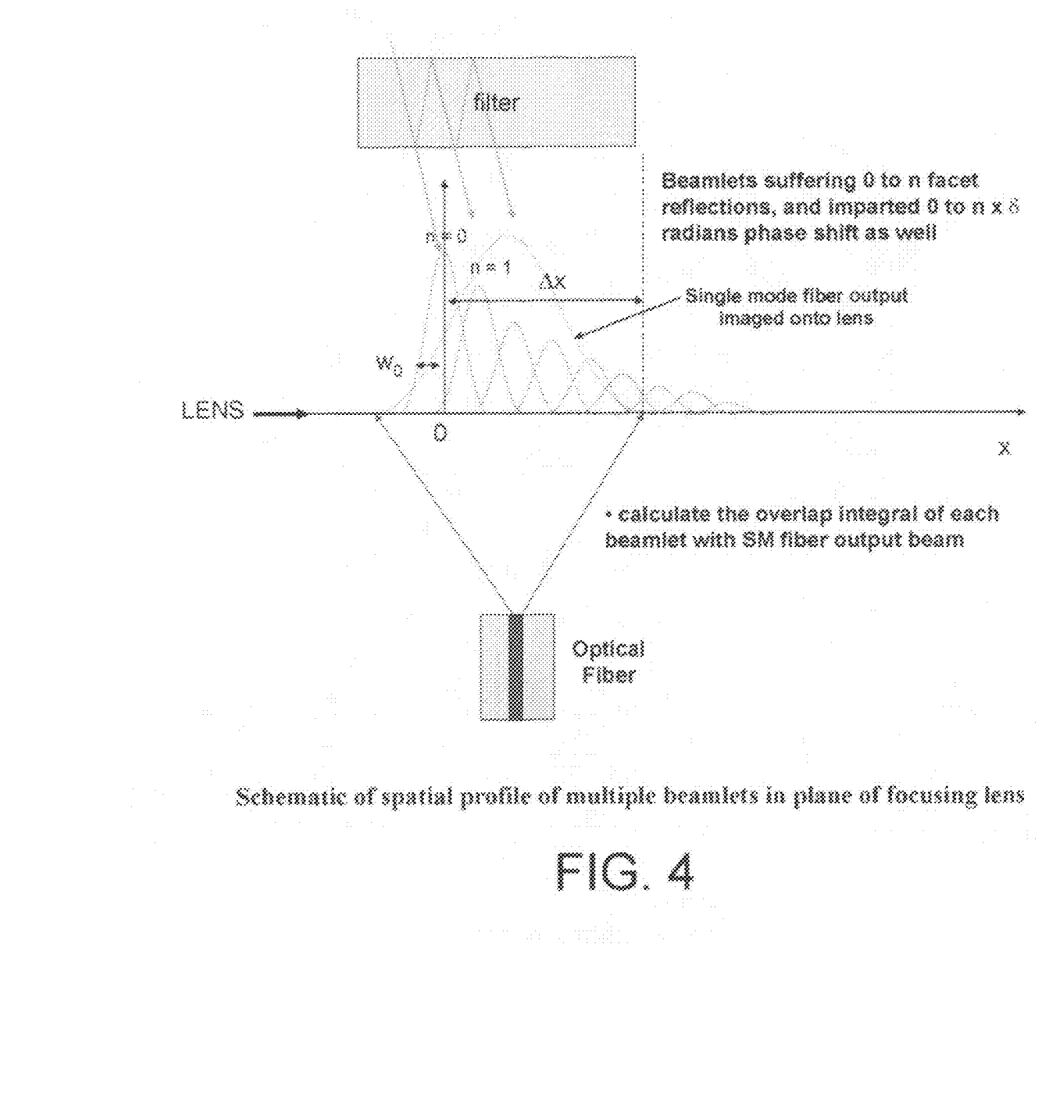
FIG. 4 is a schematic view showing the spatial profile of multiple beamlets in the plane of a focusing lens.

FIG. 4 shows a schematic view of an incident Gaussian optical beam profile, after beam spreading by the filter. As shown in FIG. 4, multiple reflections result in Gaussian parallel beams, which are sometimes hereinafter referred to as "beamlets", that are laterally shifted by a fixed amount after each roundtrip. Note that each successive beamlet has a smaller intensity than the last neighbor, since it has suffered more reflections, and hence higher loss. The end of the optical fiber is placed at the focal plane of the lens so that the lens couples part of the light beam into the single mode fiber as shown. As is known in the art, a lens converts position into angles. As a result, each successive beamlet, which is shifted relative to its neighbor, is coupled into the fiber within a certain acceptance angle, called the numerical aperture. In order to calculate the extent of the coupling, the concept of reciprocity is used, in which light is assumed to emanate from the single mode fiber into a Guassian beam, shown in blue in FIG. 4. The amount of light coupled is the overlap integral of the Gaussian beam emanating from the fiber, and the coherent sum of the beamlets of ever diminishing intensity, each of which has also experienced an ever larger phase change upon multiple reflections from the filter.

A significant aspect of the present invention is that, as the lateral position of the optical fiber is shifted relative to the optical filter, for a given lens position, the optical spectral shape of the resulting signal in the fiber changes as a function of this lateral shift.

In a preferred embodiment of the present invention, there is provided a chirp-managed transmitter comprising a frequency modulated laser source (e.g., a laser) adapted to generate a frequency-modulated light signal, an optical spectrum reshaping (OSR) element adapted to convert the frequency modulated light signal to an amplitude modulated light signal, and an optical fiber, characterized in that the spatial position of the OSR, relative to the fiber, is adapted to increase the transmission distance of the resulting signal into a dispersive fiber.

Figure 5:
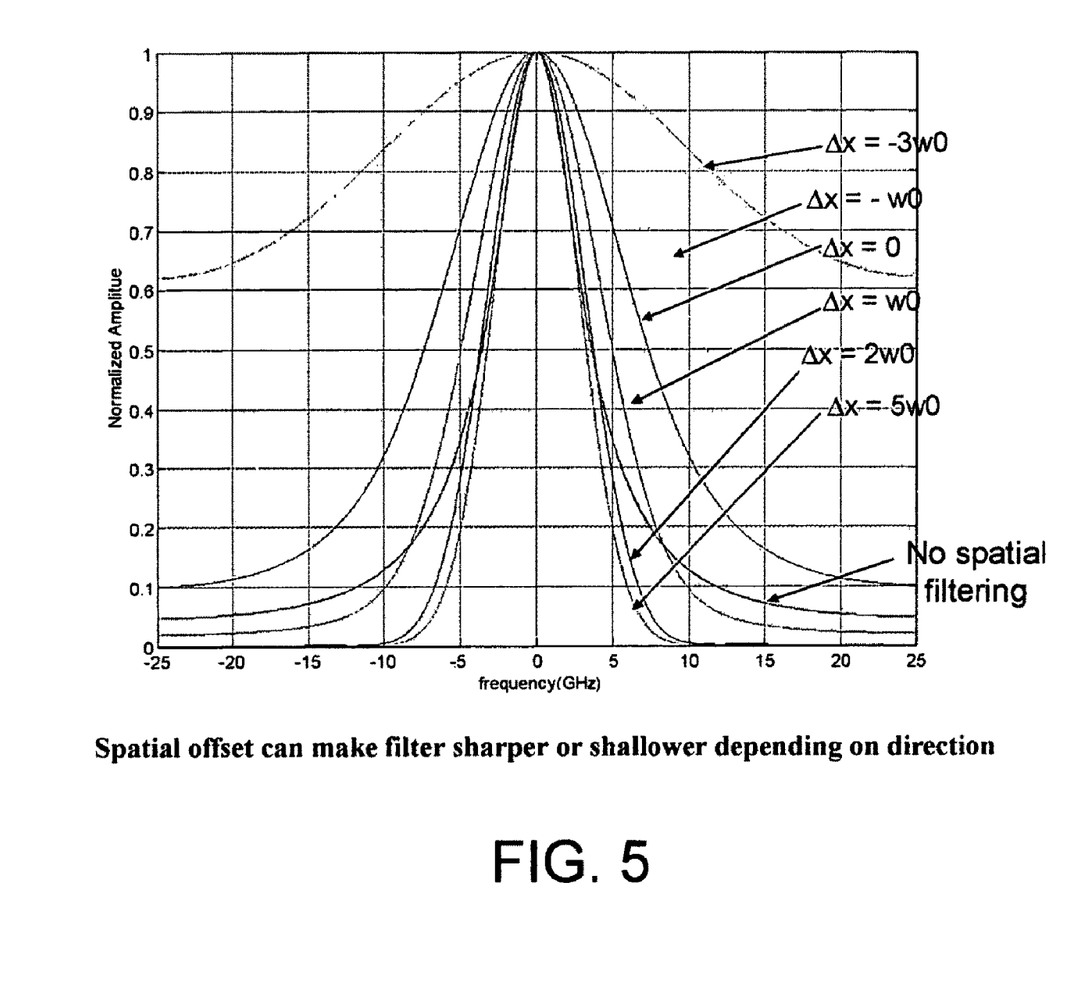
FIG. 5 is a schematic view showing how spatial offset can make the filter profile sharper or shallower, depending on direction.
Figure 6:
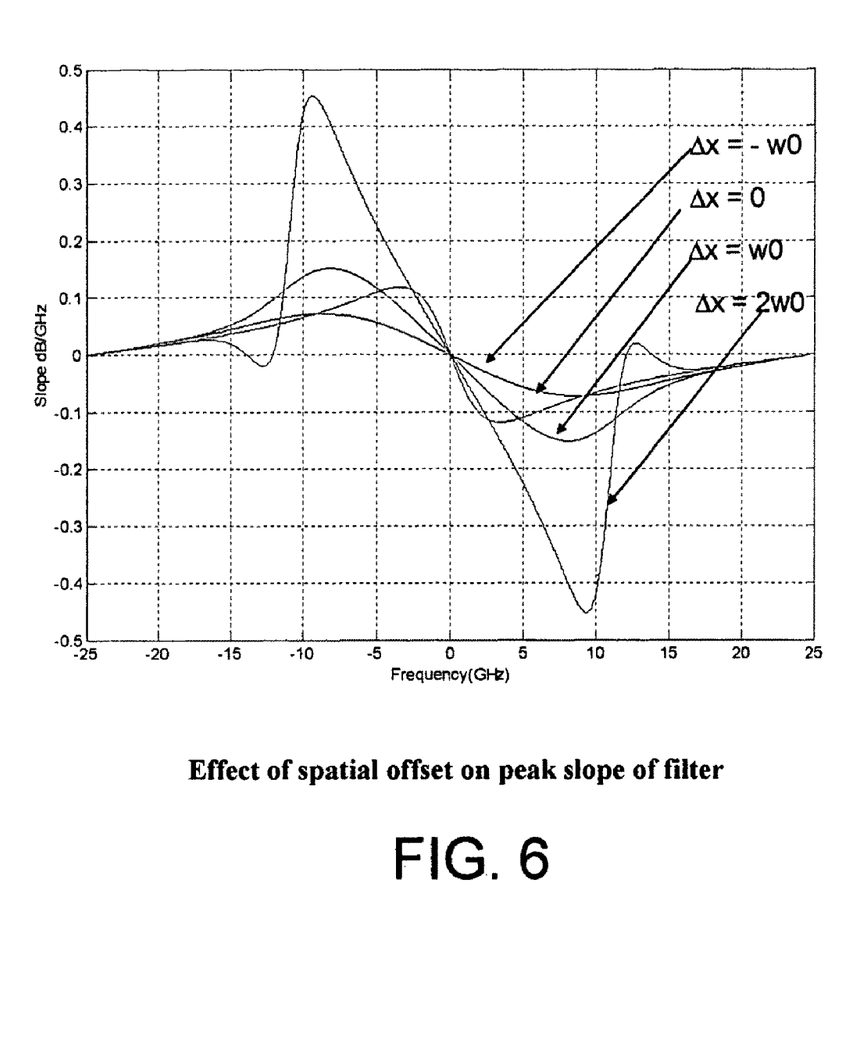
FIG. 6 is a schematic view showing the effect of spatial offset on the peak slope of the filter.

FIGS. 5 and 6 show plots of spectral response calculated for the example of beam walk off shown in FIG. 4, for a single cavity etalon filter, when the optical fiber is laterally shifted from the center by different amounts. In particular, FIG. 5 shows the optical transmission as a function of optical frequency, and FIG. 6 shows the slope in dB/GHz as a function of frequency. The key parameter here, $W_0$, is defined as the 1/e width of the Gaussian beam, and is known in the art as beam waist. It should be appreciated that key filter parameters such as bandwidth and peak slope can be adjusted by choice of offset direction. Note, for example, that the peak slope for an offset equal to 2 $W_0$ is nearly 4 times that without spatial filtering; meanwhile, the bandwidth defined as ½ intensity transmission point for the case of 2 $W_0$ offset is nearly the same as that for no spatial filtering. It should be noted that the graphs shown in FIGS. 5 and 6 are normalized to peak transmission.

In general, modification of filter spectral response by spatial filtering is accompanied by reduced power coupling level.

As it was described in the above-identified patent applications incorporated herein by reference, the optical filter for a chirp-managed laser at 10 Gb/s requires certain bandwidth and slope requirements. It was previously shown that a multicavity filter is often necessary to achieve the high slope and wide bandwidth specifications desired for a 10 Gb/s chirp-managed laser system. It is an embodiment of the present invention that the bandwidth and optical filter slope requirements of the optical spectrum reshaper (OSR) element in the chirp-managed laser transmitter system are achieved using a single cavity filter (OSR) and spatial filtering. In another embodiment of the present invention, the frequency excursion of the frequency modulated signal before the spatially filtered OSR is between 25% and 75% of the bit rate frequency, e.g., between 2.5 GHz and 7.5 GHz for a 10 Gb/s signal.

Figure 8:
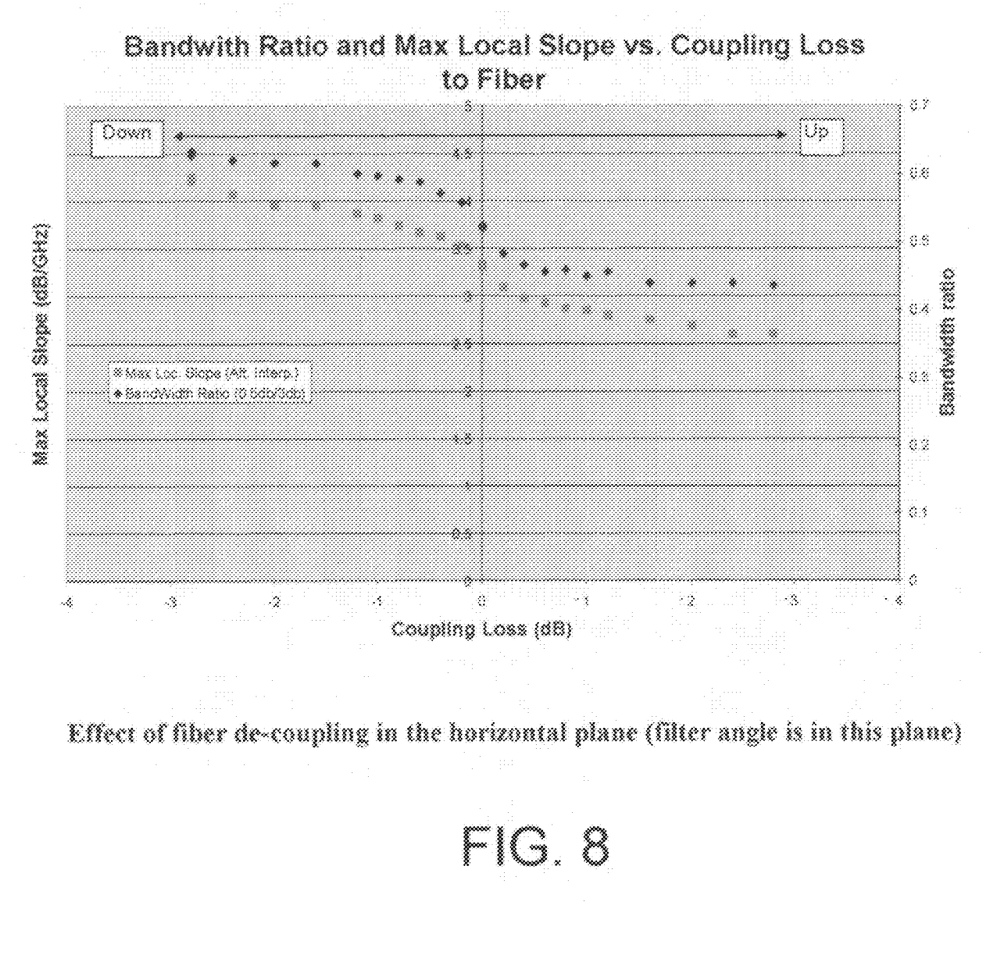
FIG. 8 is a schematic view showing the effect of fiber de-coupling in the horizontal plane (filter angle is in this plane)
Figure 9:
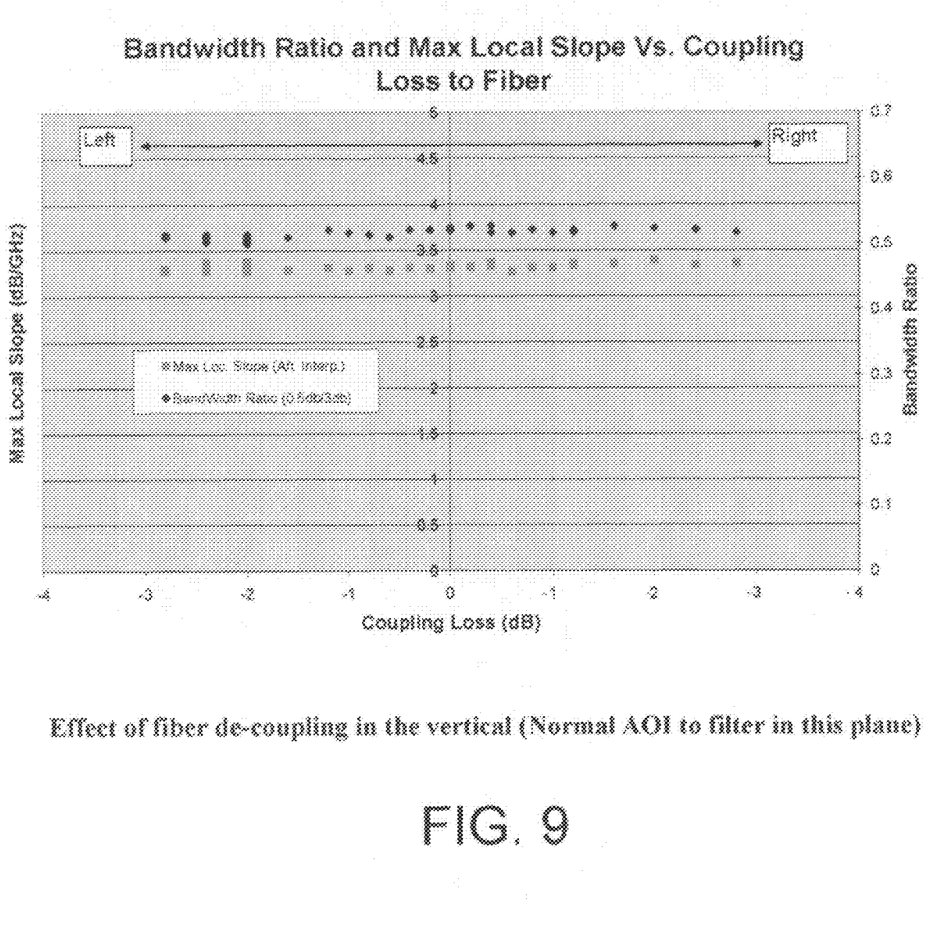
FIG. 9 is a schematic view showing the effect of fiber de-coupling in the vertical plane (normal angle of incidence, AOI, to filter in this plane)

FIGS. 8 and 9 show experimental results of the effect on the spectral response when the optical fiber is de-coupled from the optimum coupling point in the horizontal and vertical directions so as to induce the desired spatial filtering.

Figure 7:
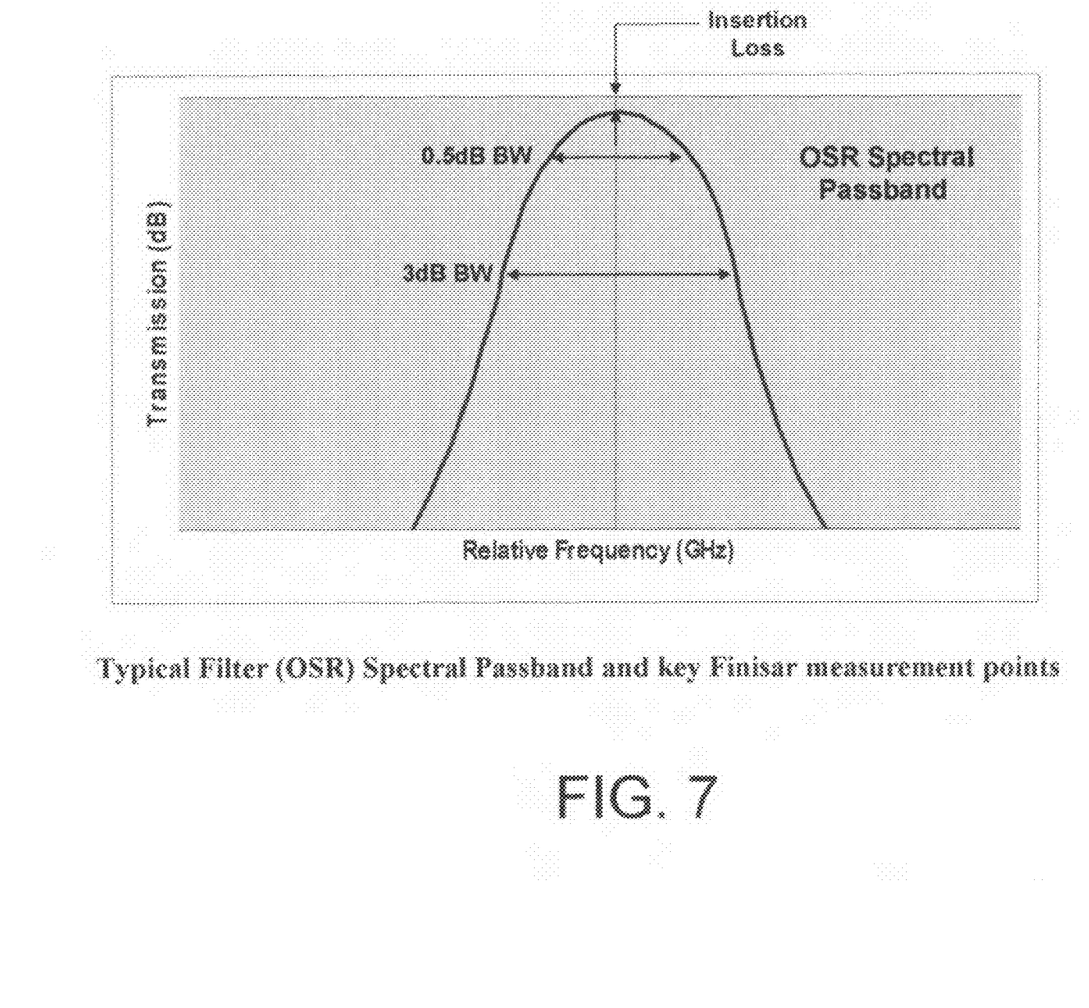
FIG. 7 is a schematic view showing the spectral passband, and key measurement points, of a typical OSR filter in a chirp-managed laser transmitter.

For chirp-managed laser applications, the optical spectrum reshaper (OSR) filter is typically a narrow band pass design. A key design parameter useful for filter design in this case is called bandwidth ratio, which is defined as the ratio of the 0.5 dB full-width-half maximum (FWHM) to the 3 dB FWHM of the measured spectral filter shape, as shown in FIG. 7. FIG. 8 shows that the combination of beam "spread" and fiber de-coupling allows some control of the filter shape. Also shown is the effect of fiber de-coupling on the maximum local slope of the filter (the derivative of the transmission response)—it follows a similar trend to the bandwidth ratio. The beam "spread" only occurs in the plane in which the filter is initially angled. For the case of a normal angle of incidence (AOI), the effect of de-coupling the fiber is negligible for practical loss values, e.g., <4 dB excess loss.

In a preferred embodiment of the present invention, the filtering by the OSR is adjusted by utilizing spatial filtering in the focal plane of a focusing lens. In another embodiment of the present invention, the spatial filter can be a simple single-mode optical fiber with a well-defined numerical aperture that limits the coupling of at least part of the light from the filter into the fiber. Spatial filtering can also be achieved by use of a physical aperture that spatially limits the amount of light coupled into the fiber. In yet another embodiment of the present invention, the spatial filtering can also be applied between the exit facet of the filter and the focusing lens, as indicated by Point A in FIG. 2. In this case, the beam is collimated and the spatial profile can be modified by inserting shaped apertures to block/attenuate specific areas of the beam.

Figure 10:
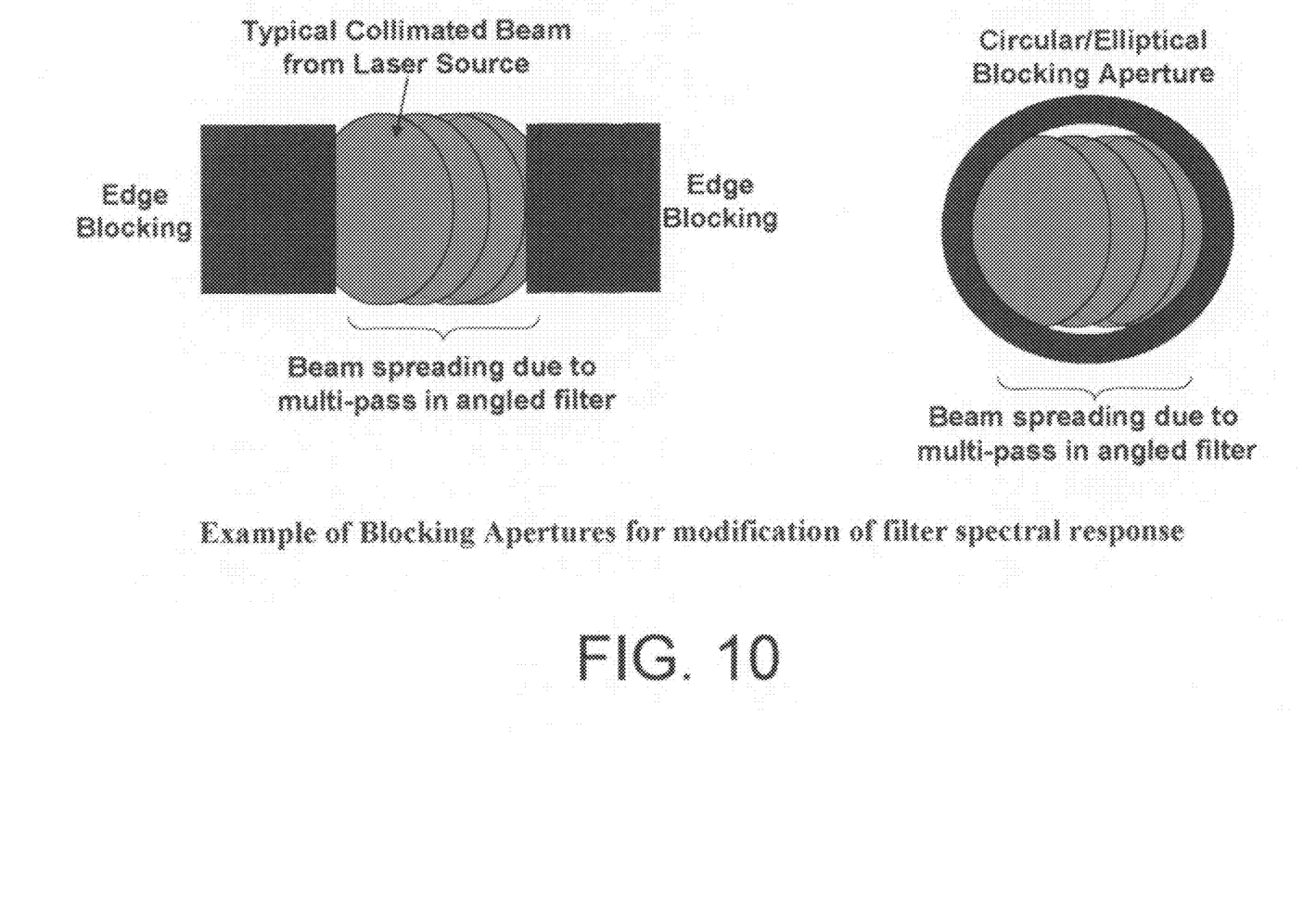
FIG. 10 is a schematic view showing an example of blocking apertures for modification of filter spectral response.

As described above, a simple method of generating spatial filtering is by the offsetting, and the de-coupling of, the optical fiber from its peak power coupling position. This is effective once the filter is set at a non-zero angle of incidence to the incoming beam from the frequency modulated laser. It is also possible to place customized apertures in the collimated optical beam where the power in the "spread" beam is attenuated in selected areas. Examples of edge and circular/elliptical apertures are shown in FIG. 10.

MODIFICATIONS

It will be understood that many changes in the details, materials, steps and arrangements of parts, which have been herein described and illustrated in order to explain the nature of the invention, may be made by those skilled in the art without departing from the principles and scope of the present invention.

What is claimed is:

1. An optical system comprising a frequency modulated laser source adapted to produce a frequency modulated optical beam, an optical spectrum reshaper (OSR) adapted to receive the frequency modulated optical beam from the laser source and convert it into an amplitude modulated optical beam, a focusing lens adapted to receive the amplitude modulated optical beam from the OSR and focus the same, and an optical fiber adapted to receive the amplitude modulated optical beam from the focusing lens and transmit an optical signal;

characterized in that the OSR has a central axis, the focusing lens has a central axis, and the optical fiber has a central axis, with the central axis of the optical fiber being laterally offset from at least one of the central axis of the OSR and the central axis of the focusing lens so as to effect spatial filtering and thereby generate a desired optical transmission characteristics for the the resulting optical signal optical signal in the optical fiber.

2. An optical system according to claim 1, wherein the frequency excursion of the frequency modulated optical beam is between 25% and 75% of a bit rate frequency of the frequency modulated optical beam.

3. An optical system according to claim 1, wherein the OSR is a single cavity filter.

4. An optical system according to claim 1, wherein the OSR is a multi-cavity filter.

5. An optical system according to claim 1, wherein the laser source has a central axis, and further wherein the central axis of the OSR is angled with respect to central axis of the laser source.

6. An optical system comprising a frequency modulated laser source adapted to produce a frequency modulated optical beam, an optical spectrum reshaper (OSR) adapted to receive the frequency modulated optical beam from the laser source and convert it into an amplitude modulated optical beam, a focusing lens adapted to receive the amplitude modulated optical beam from the OSR and focus the same, and an optical fiber adapted to receive the amplitude modulated optical beam from the focusing lens and transmit an optical signal;

characterized in that the amplitude modulated optical beam is coupled into the optical fiber such that it is spatially filtered when it enters the optical fiber in order to produce a desired optical transmission spectrum for the the resulting optical signal optical signal in the fiber.

7. An optical system according to claim 6, wherein the OSR has a central axis, the focusing lens has a central axis and the optical fiber has a central axis, and further wherein spatial filtering is obtained by laterally offsetting the central axis of the optical fiber from at least one of the central axis of the OSR and the central axis of the focusing lens.

8. An optical system according to claim 7, wherein spatial filtering is obtained by laterally offsetting the central axis of the focusing lens and the central axis of the optical fiber from the central axis of the OSR.

9. An optical system according to claim 6, wherein spatial filtering is obtained by longitudinally offsetting the optical fiber from a focal plane of the optical beam.

10. An optical system according to claim 6, wherein the OSR is a single cavity filter, and further wherein a peak slope of a resulting optical spectrum in the fiber is increased, without substantially reducing its optical bandwidth.

11. An optical system according to claim 6, wherein spatial filtering is achieved by placing blocking apertures in the optical beam located between an exit facet of the OSR and the optical fiber.

12. An optical system according to claim 11 wherein the blocking apertures are placed before the focusing lens.

13. An optical system according to claim 12 wherein the blocking apertures are placed after the focusing lens.

14. An optical system according to claim 6, wherein the OSR has a central axis, the focusing lens has a central axis and the optical fiber has a central axis, and further wherein spatial filtering is obtained by laterally offsetting the central axis of the optical fiber from at least one of the central axis of the OSR and the central axis of the focusing lens by an amount about equal to 2 $W_0$, where $W_0$ is a beam waist size of the amplitude modulated optical beam.

* * * * *